US012357982B2

(12) United States Patent
Passos De Souza et al.

(10) Patent No.: US 12,357,982 B2
(45) Date of Patent: Jul. 15, 2025

(54) METHOD FOR OBTAINING A SUPPORT FOR HYDROREFINING CATALYSTS, SUPPORT FOR HYDROREFINING CATALYSTS, HYDROREFINING CATALYSTS, PROCESS FOR OBTAINING HYDROREFINING CATALYSTS, AND USE OF SUPPORT IN HYDROREFINING CATALYSTS

(71) Applicant: Petróleo Brasileiro S.A.—Petrobras, Rio de Janeiro (BR)

(72) Inventors: Vivian Passos De Souza, Rio de Janeiro (BR); Carlos Alberto De Araujo Monteiro, Rio de Janeiro (BR); Bruno Martins Santos, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 502 days.

(21) Appl. No.: 17/789,393

(22) PCT Filed: Dec. 17, 2020

(86) PCT No.: PCT/BR2020/050560
§ 371 (c)(1),
(2) Date: Jun. 27, 2022

(87) PCT Pub. No.: WO2021/127765
PCT Pub. Date: Jul. 1, 2021

(65) Prior Publication Data
US 2023/0050542 A1    Feb. 16, 2023

(30) Foreign Application Priority Data

Dec. 27, 2019   (BR) ...................... 10 2019 028121 9

(51) Int. Cl.
*B01J 37/08*     (2006.01)
*B01J 21/02*     (2006.01)
*B01J 37/02*     (2006.01)
*B01J 37/04*     (2006.01)
*C10G 45/04*     (2006.01)

(52) U.S. Cl.
CPC ............. *B01J 37/088* (2013.01); *B01J 21/02* (2013.01); *B01J 37/02* (2013.01); *B01J 37/04* (2013.01); *C10G 45/04* (2013.01); *C10G 2300/4075* (2013.01)

(58) Field of Classification Search
CPC .......... B01J 37/088; B01J 21/02; B01J 37/02; B01J 37/04
See application file for complete search history.

(56) References Cited

U.S. PATENT DOCUMENTS

| 4,034,061 A | 7/1977 | MCarthur |
| 4,672,049 A | 6/1987 | Chen et al. |
| 4,756,822 A | 7/1988 | Chen et al. |
| 5,609,750 A | 3/1997 | Nat et al. |
| 7,837,960 B2 | 11/2010 | Bhaduri et al. |
| 7,879,224 B2 | 2/2011 | Euzen et al. |
| 2012/0065056 A1 | 3/2012 | Domokos et al. |

FOREIGN PATENT DOCUMENTS

| BR | PI0010760 B1 | 2/2022 | |
| CN | 101332430 A | 12/2008 | |
| CN | 102989493 A | 3/2013 | |
| CN | 103100390 A | 5/2013 | |
| CN | 109718815 A * | 5/2019 | |
| RU | 2691064 C1 * | 6/2019 | |
| WO | 2010121807 A1 | 10/2010 | |
| WO | 2011036862 A1 | 3/2011 | |
| WO | WO-2018161952 A1 * | 9/2018 | .............. B01J 27/19 |
| WO | 2019059807 A1 | 3/2019 | |

OTHER PUBLICATIONS

Tongsan D. Xiao, "Synthesis of Aluminum Nitride/Boron Nitride Composite Materials", 1993, Journal of the American Ceramic Society, vol. 76, No. 4, p. 987-992.*
Martyla et al., Influence of the method of synthesis on hydrogen adsorption properties of mesoporous binary $B_2O_3/Al_2O_3$ gel systems, 2011, International journal of hydrogen energy, 36, 8358-8364.*
CN-109718815-A Machine Translation (Year: 2019).*
RU-2691064-C1 Machine Translation (Year: 2019).*
WO-2018161952-A1 Machine Translation (Year: 2018).*
Becker et al. (1994) "Identification of the Thermal Decomposition Behavior of Ammonium Pentaborate", Thermochimica Acta, 235(2):211-216.
Chen et al. (Sep. 1, 1994) "Hydrodesulfurization of Residue Oils Over NiMO/alumina-aluminum Borate Catalysts: Effect of Boria Content", Industrial & Engineering Chemistry Research, 33(9):2040-2046.
Chen et al. (Apr. 6, 1999) "Hydrotreating of Residue Oil Over Aluminum Borate-Supported CoMo and NiMo Catalysts", Catalysis Today, 50(1):57-61.
Dubois et al. (1996) "Effects of Boron in Co—Mo/B—Al2O3 Hydrotreatment Catalysts", Catalysis Today, 29:191-195.
Maity et al. (2011) "Effect of Preparation Methods and Content of Boron on Hydrotreating Catalytic Activity", Energy Fuels, 25(7):3100-3107.

(Continued)

*Primary Examiner* — Michael Forrest
*Assistant Examiner* — Nicole Lee Quist
(74) *Attorney, Agent, or Firm* — Morrison & Foerster LLP

(57) ABSTRACT

The present invention addresses to obtaining a support of hydrorefining catalysts by an innovative preparation route that reduces the problem of loss (or leaching) of boron over the operating time of industrial units. As the presence of boron in catalysts contributes to increased activity (hydrogenating and acidic) and stability for the hydrorefining reactions (hydrotreating and hydrocracking), its maintenance in the catalyst guarantees the preservation of the properties in operation, throughout the entire cycle of campaign of industrial units.

14 Claims, No Drawings

(56) References Cited

OTHER PUBLICATIONS

Olson et al., "Poisoning and Drug Overdose", McGraw Hill, 6(34).
Tsai et al. (Aug. 1, 1991) "Hydrodesulfurization and Hydrodemetalation Reactions of Residue Oils Over Cobalt-molybdenum/aluminum Borate Catalysts in a Trickle Bed Reactor", Industrial & Engineering Chemistry Research, 30(8):1801-1810.

\* cited by examiner

METHOD FOR OBTAINING A SUPPORT FOR HYDROREFINING CATALYSTS, SUPPORT FOR HYDROREFINING CATALYSTS, HYDROREFINING CATALYSTS, PROCESS FOR OBTAINING HYDROREFINING CATALYSTS, AND USE OF SUPPORT IN HYDROREFINING CATALYSTS

CROSS-REFERENCE TO RELATED APPLICATIONS

This application is a national phase application, filed under 35 U.S.C. § 371, of PCT International Patent Application No. PCT/BR2020/050560, filed Dec. 17, 2020, and claims benefit of and priority to Brazilian application BR 10 2019 028121 9, filed on Dec. 27, 2019, the disclosures of all of which are incorporated herein by reference in their entirety.

FIELD OF THE INVENTION

The present invention is related to a process for obtaining a support for hydrorefining catalysts, by an innovative route, aiming at reducing the loss by leaching and/or a correlated process of loss of the additive based on the chemical element boron and its chemical derivatives. Hydrorefining catalysts for processing streams from petroleum fractions and their mixtures with renewable streams (biomass in natural state and/or obtained from a previous processing) and/or obtained in Fischer-Tropsch-type processes containing boron-based chemical derivatives have been used to improve the performance of hydrocracking reactions (HCC), hydrodenitrogenation (HDN), hydrodesulfurization (HDS), olefin hydrogenation (HDO), metal removal or hydrodemetallization (HDM), hydrogenation of aromatics (HDA) and other processes involving catalysis at hydrogenating, hydrogenolytic and/or acidic sites.

DESCRIPTION OF THE STATE OF THE ART

Over the years, the oil processed in refineries has become heavier (decreased °API), with a higher content of contaminants (olefins, sulfur, nitrogen, metals) and aromatics. In this way, an increase in the yield of heavy cuts is observed in relation to light (naphtha) and medium (kerosene and diesel oil) distillates. At the same time, the environmental legislation has intensified quality restrictions, mainly with respect to limits on sulfur and aromatics contents in fuels.

In view of this scenario, there is a growing demand from refineries for technological solutions to improve the quality of oil fractions (naphtha, kerosene and diesel oil) via hydrotreatment processes (HDT) and for the conversion of heavy fractions (diesel and residues) in high value-added products (naphtha, kerosene, diesel oil, marine fuels, lubricating base oils and paraffins) via catalytic hydrocracking (HCC) processes. The transition to a low carbon economy has also driven the development of hydrorefining processes for processing loads containing renewable content (biomass in natural state and/or obtained from previous processing). The hydrorefining of streams obtained from the Fisher-Tropsch process also contributes to the production of fuels, lubricating base oils and paraffins of excellent quality. These solutions go through the study and development of more active (high conversion and selectivity) and more stable (low deactivation rates) catalysts for the reactions of metal removal or hydrodemetallization (HDM), olefin hydrogenation (HDO), hydrodesulfurization (HDS), hydrodenitrogenation (HDN) and hydrogenation of aromatics (HDA), in addition to hydrocracking (HCC).

Catalysts for hydrocracking diesel have their performance maximized by optimizing the balance of hydrogenating (metallic, reduced or sulfided sites) and acidic (acidic support, like silica-alumina or zeolites, or containing additives responsible for the acidic function of cracking) functions.

In this regard, researches show that conventional catalysts (composed of mixed sulfides of NiMo and CoMo) can be improved when using different supports compared to traditional $\gamma$-$Al_2O_3$, such as carbon/carbides, silica, titania, zirconia and zeolites. Mixtures of $SiO_2$—$Al_2O_3$, $SiO_2$—$TiO_2$ and $ZrO_2$—$Al_2O_3$ were also considered due to their superior acid-base properties. Recently, many catalysts are supported in $B_2O_3$—$Al_2O_3$ mixtures due to the higher acidity provided by boron.

In this perspective, the state of the art describes that the addition of boron, in the form of chemical derivatives based on the chemical element boron, to alumina, used as a support for the sulfided NiMo and CoMo catalysts, improves the catalytic performance for the hydrocracking reactions (HCC), hydrodenitrogenation (HDN) and hydrodesulfurization (HDS). Maity et al. (Effect of preparation methods and content of boron on hydrotreating catalytic activity, *Energy Fuels* 2011, 25, 3100-3107) evaluated the effect of boron addition on alumina-supported NiMo catalysts, wherein the active metallic phases and the additive were incorporated into the support via impregnation techniques.

The addition of boron resulted in catalysts with greater dispersion of the metallic phase and the active phase ($MoS_2$). This improvement was attributed to the formation of a boron monolayer on the alumina surface, reducing the interaction between the metallic phases and the support.

The performance of boron additive catalysts was evaluated for thiophene hydrodesulfurization, cumene hydrocracking, diesel hydrodesulfurization, petroleum hydrodesulfurization and hydrodemetallization reactions.

The boron-containing catalysts showed higher cumene hydrocracking and thiophene hydrodesulfurization activity, indicating an increase in their acidic function. Additionally, it was verified that the presence of boron can contribute to the reduction of catalytic deactivation during the hydrotreatment of heavier fractions, increasing the stability of the catalyst (longer campaign times).

Several patents (US 20120065056 A1, CN 103100390 A, U.S. Pat. No. 7,837,960 B2, CN 101332430 A, U.S. Pat. No. 7,879,224 B2 and CN 102989493 A) have shown improvements in the distribution of metallic sites (hydrogenating function) and increased acidic strength (hydrogenation function) with the use of boron as an additive for hydrorefining catalysts (hydrotreatment for fuel production and hydrocracking of diesels and residues).

Similarly, Chen and Tsai, *Catalysis Today* 50(1999) 57-61, evaluated CoMo and NiMo catalysts supported in various Aluminum/Boron ratios in hydrodesulfurization and hydrodemetallization (HDM) reactions. In these tests, it was found that the hydrodesulfurization activity, for both CoMo and NiMo catalysts, in the presence of Boron, was improved, making the catalysts more active. Said document points out that the optimal $B_2O_3$ content for maximum activity was 4% by mass. This same boron value was indicated for maximum hydrodemetallization activity, in this case, considering the removal of Nickel and Vanadium.

In the same perspective, documents PI 00107603, U.S. Pat. Nos. 4,756,822, 4,672,049, 5,609,750 and WO 2011036862 mention supported catalysts containing boron and/or boron-doped alumina as an improved option for hydrocracking, hydrotreating, hydrodesulfurization and/or hydrodenitrogenation processes.

However, despite the advantages associated with the use of boron, catalysts with boron additives present as a disadvantage their easy leaching in the starting and operating conditions of industrial hydrorefining units. This aspect results in the reduction of the benefits provided by the additivation with boron, in the reduction of the increment of activity (hydrogenating and acidic) and in the decrease of the stability (deactivation) of the catalyst over time.

Document U.S. Pat. No. 4,034,061 corroborates the fact that boron presents easy leaching, mentioning that boron-alumina-based catalysts can easily lose boron. This document demonstrates that the support, when calcined at 982° C. and then subjected to steam passage at 200° C. for 16 hours, lost 2.3% of the initial boron content and, when calcined at 1204° C. for 1 hour, it lost 13.3% of the initial boron content. In leaching with boiling water for 2 hours, it lost 6.4% of the initial boron content and, finally, when subjected to leaching with boiling water for 2 hours, followed by leaching with ammonia solution for 1 hour, it lost 14.3% of the initial content. The solution presented by the mentioned document does not reduce the boron leaching process, it only addresses to the removal of free boron from the catalyst, whose presence is undesirable for said process.

Likewise, Dubois and Fujieda (Effects of boron in Co—Mo/B—$Al_2O_3$ hydrotreatment catalysts. *Catalysis Today* 29 (1996) 191-195) prepare catalysts for hydrocracking middle distillates, with 0 to 10% by mass B, 10% by mass Mo and 3% by mass Co, where the support was obtained by physical mixing and extrusion of alumina with boron, followed by drying and calcination. The results showed that higher concentrations of boron result in a greater activity for cracking, related to the increase in alumina acidity due to the presence of boron. Regarding the hydrodesulfurization function, there is a small increase in its activity and with regard to hydrodenitrogenation, the increase in activity is significant. Despite the beneficial effects, the same document demonstrates that after 16 h of extraction, the original boron content of the catalyst was reduced from the original 3.7% by mass to values close to zero, and in just two hours of extraction, the original content dropped to 1.7% by mass. The effect is still highlighted on non-calcined supports. Thus, the aforementioned document, despite pointing out the beneficial effects of boron, does not suggest ways to reduce its loss during the aforementioned processes.

In addition to the problems mentioned above, boron leaching has other negative aspects; in this regard, Becker et al. (Identification of the thermal decomposition behavior of ammonium pentaborate—*Thermochimica Acta*, 235, 211, 2004) report that borate and ammonium salts can be formed by the reaction of boric acid, ammonia and water. In hydrorefining units, ammonia is formed from the hydrodenitrogenation reactions of the nitrogenous compounds present in the charges, water is added at different steps of the process and, with the leaching of boron from the catalyst, conditions are created for the formation of this salt, which can precipitate in colder parts of the unit, which can cause high loss of charge and the need to stop the plant, with the consequent loss of production and profitability for the refinery.

Another negative aspect related to boron leaching is the exposure of the environment, fauna and humans to the harmful and toxic effects of boron (K. R. Olson, *Poisoning and drug overdose*, 6th ed., chapter 34, McGraw Hill). In the production of paraffins and lubricating base oils of medical and food grade, a hydrofinishing step is necessary (for saturation of polyaromatic compounds harmful to human health). In these industrial units, hydrorefining catalysts are used. The development of hydrorefining catalysts with low boron leaching contributes to the maintenance of the advantages arising from this additivation and reduces possible exposure to the harmful agent to the environment, fauna and humans.

Trying to propose more alternative means for the incorporation of boron, patent WO2010121807 describes the method of preparing a catalyst containing at least one metal of group VIB and one metal of group VIII, a component with phosphorus and a component with boron, with at least 1% by mass of phosphorus expressed as $P_2O_5$ and a boron component, expressed as $B_2O_3$, both in relation to the total weight of the catalyst. The catalyst is prepared by co-extrusion of boron with the support, the extrudate being dried and calcined and then impregnated with the solution containing phosphorus and the metal of group VIB and a metal of group VIII. The co-extrusion is advantageous over the impregnation process as it allows higher boron levels in the final catalyst and requires only one calcination stage instead of multiple steps. Thus, despite proposing ways of incorporating higher levels of boron, the mentioned document fails to propose a solution for the leaching processes of this additive.

Still in this context, it is valid to cite other works in the literature, which use aluminum nitrate, boric acid and ammonium hydroxide in the synthesis of hydrorefining catalysts, using the conventional methodology of alumina preparation, with the inclusion of boric acid in one of the steps, without, however, addressing to ways of reducing boron leaching (M. C. Tsai and Y. W. Chen, *Eng. Chem. Res.* 1991, 30, 1801-1810 and *Eng. Chem. Res.* 1994, 33, 2040-2046.

In this scenario, it was identified that the conventional methods of additivation of hydrorefining catalysts with boron, where it is added to the catalytic precursor in a different step, are responsible for its easy leaching under operational conditions of activation, start-up and operation of the industrial hydrorefining plants.

Thus, the main problem associated with the use of boron as an additive is its easy leaching, in the starting and operating conditions of industrial hydrorefining units, resulting in practical losses from the increase in catalytic activity and stability provided by the presence of boron. Leaching also causes the release of boron to the environment with the consequent harmful effects to the environment reported by the specialized literature.

In order to solve such problems, the present invention was developed, in which a method of obtaining a support, by an innovative preparation route, was proposed, which reduces the problem of loss (or leaching or related processes of loss) of boron (or boron-containing chemical derivatives) over time. With the presence of boron in the catalysts, there is a significant increase in activity (hydrogenating and acidic) and stability for the hydrorefining reactions (hydrotreating and hydrocracking).

In addition, the fixation of boron in the catalyst guarantees the preservation of its properties in operation, throughout the entire campaign of the industrial units. Additionally, it minimizes the release of boron to the environment and the contamination of paraffins and lubricating base oils of medical and food grade from hydrofinishing processes that use catalysts with boron additives.

Thus, it is ascertained that the above-mentioned anteriorities address to catalysts, catalytic compositions and methods for the production of a catalyst support material and/or a catalyst itself, but do not solve the problem of boron loss.

BRIEF DESCRIPTION OF THE INVENTION

It is the objective of the present invention to obtain a support by an innovative route of preparation that reduces the problem of loss of boron, by leaching or a correlated process over time, as observed in the catalysts and supports obtained by the current state of the art. As the presence of boron in the catalysts brings properties of increasing activity (hydrogenating and acidic) and stability to the hydrorefining reactions (hydrotreating and hydrocracking), its maintenance in the catalyst guarantees the preservation of the properties in operation, throughout the entire campaign of industrial units. Additionally, with the use of catalysts resistant to boron leaching, contamination of the environment and of paraffins and lubricating base oils of medical and food grade from hydrofinishing processes is minimized.

DETAILED DESCRIPTION OF THE INVENTION

In particular, the present invention addresses to a method of obtaining a support by an innovative route of preparation that reduces the problem of loss (or leaching) of boron over time. The support can be applied in the synthesis of catalysts used in hydrorefining processes.

Boron is understood to mean all chemical derivatives (substances and molecules) containing the chemical element boron in their constitution.

Preferably, the support obtained by the method defended herein applies to catalysts for hydrorefining processes, mainly olefin hydrogenation, hydrodemetallization, hydrodesulfurization, hydrodenitrogenation, hydrodearomatization and hydrocracking. The reactions can occur singly or in conjunction. Processed charges can be of mineral origin (oil fractions with a wide distillation range, from naphtha to residues, passing through lubricating base oils and paraffins), of renewable origin (pyrolysis bio-oils, vegetable oils, oils from biomass processing, biomass in its natural state), from upstream processes (e.g., distillates and paraffins obtained from Fischer-Tropsch processes (Gas-to-liquid, GTL) and their mixtures.

Hydrotreatment catalysts include materials consisting of hydrogenating phases in oxidized form (at least one element of Group VIII (IUPAC) and/or Group VIB (IUPAC) and mixtures of both) supported in an inert matrix and/or with some acid-base activity (alumina, silica-alumina, zeolite, silica, titania, zirconia, magnesia, clay, hydrotalcite, among others) and/or with additives that promote acidic functions or of a specific nature, such as, for example, compounds based on boron and phosphorus. The catalyst shows activity in the sulfided form. Other possibilities for hydrotreating catalysts include the use of noble metals (Pt, Pd Rh, Ir, Ru, pure or multimetallic) as the hydrogenating phase. In this case, these are active in reduced form. The operating conditions of the hydrotreating process include $H_2$ partial pressure from 1 to 200 bar (0.1 to 20 MPa), preferably from 40 to 150 bar (4 to 15 MPa), more preferably from 50 to 120 bar (5 to 12 MPa); temperature between 200 and 450° C., preferably between 320 and 430° C., more preferably between 340 and 410° C. and volumetric space velocity (liquid hourly space velocity—LHSV—(ratio between the charge volumetric flow rate and the catalyst volume)) between 0.1 and 5 $h^{-1}$, preferably between 0.2 and 3.0 $h^{-1}$, more preferably between 0.3 and 2.0 $h^{-1}$. Hydrocracking catalysts include materials consisting of hydrogenating phase in oxidized form (at least one element of Group VIII (IUPAC) and/or of Group VIB (IUPAC) and mixtures of both) supported in an inert matrix and/or with some acid activity (alumina, silica-alumina, zeolite, silica, titania, zirconia, among others) and/or with additives that promote acidic functions or of a specific nature, such as compounds based on boron and phosphorus. The catalysts are activated by sulfidation. Other possibilities for hydrocracking catalysts include the use of noble metals (Pt, Pd Rh, Ir, Ru, pure or multimetallic) as the hydrogenating phase. In this case, these are active in reduced form. Operating conditions of the hydrocracking process include $H_2$ partial pressure from 1 to 200 bar (0.1 to 20 MPa), preferably from 40 to 150 bar (4 to 15 MPa), more preferably from 50 to 120 bar (5 to 12 MPa); temperature between 200 and 450° C., preferably between 320 and 430° C., more preferably between 340 and 410° C. and LHSV between 0.1 and 5 $h^{-1}$, preferably between 0.2 and 3.0 $h^{-1}$, more preferably between 0.3 and 2.0 $h^{-1}$.

In a first aspect, the present invention addresses to a method of obtaining a support for hydrorefining catalysts, by an acidic route, which comprises the following steps:
  (a) mixing an aluminum source, an organic acid and a boron source;
  (b) adding sufficient deionized water to (q.s.) allow the reactants to mix;
  (c) heating the mixture obtained in step (b) between 25 and 60° C., preferably 30 and 50° C. and more preferably 30 and 35° C. for 5 to 60 min, preferably 5 to 30 min and more preferably 5 to 10 min;
  (d) homogenizing the reagents, under agitation;
  (e) heating the mixture obtained in step (d) to 60 to 80° C., preferably 60 to 70° C. and more preferably 60 to 65° C. and maintaining for 1 to 4 hours, preferably 1 to 2 hours and more preferably 1 hour;
  (f) raising the temperature of the mixture obtained in step (e) to 80 to 120° C., preferably to 80 to 100° C. and more preferably to 80 to 85° C. and maintaining for 1 to 3 hours, preferably 1 to 2 hours and more preferably 1 to 1.5 hour;
  (g) turning off agitation and heating, allowing the sample to cool to room temperature;
  (h) drying the material obtained in step (g) at 80 to 120° C., preferably 100 to 120° C. and more preferably 115 to 120° C. for up to 8 hours, preferably for up to 6 hours and more preferably for up to 4 hours;
  (i) calcining the material obtained in step (f) at 500 to 800° C., preferably at 600° C. to 800° C. and more preferably at 700 to 710° C. for up to 6 hours, preferably for up to 4 hours and more preferably for up to 3 hours.

In this regard, the pH of the mixture is measured with an interval of 30 minutes from the moment the mixture reaches a temperature of 60 to 65° C. (step (e)).

Further in this aspect, the mixture of the aluminum source with the organic acid must be carried out in an X/Y molar ratio, where X is the aluminum source and Y the organic acid. The molar ratio can vary from 10/1 to 1/10, preferably from 5/1 to 1/5 and more preferably from 2/1 to 1/2.

The boron source is added so that the boron content, expressed as an oxide ($B_2O_3$) and based on the total support mass, can be from 0.1 to 10% by mass, preferably from 0.5 to 8% by mass and more preferably from 1 to 5% by mass of the final support.

Further in this aspect, the aluminum source(s) can be pure(s) or mixture(s) with each other, and can include aluminum-based compounds, preferably aluminum chloride, aluminum sulfate, aluminum isopropoxide, aluminum nitrate, and more preferably, aluminum nitrate.

Further in this aspect, the organic acid(s) can be pure(s) or mixture(s) with each other, which can include carboxylic acids containing 1 to 6 carbon atoms, preferably containing 1 to 4 carbon atoms, and more preferably, acetic acid.

Further in this aspect, the source(s) of boron can be pure(s) or mixture(s) with each other, and can include compounds based on boron, meta-boric acid ($HBO_2$), ortho-boric acid ($H_3BO_3$), ammonium borate tetrahydrate [$(NH_4)_2B_4O_7.4H_2O$], sodium tetra borate, ammonium borate, ammonium tetra borate, boron oxide ($B_2O_3$), various mono, di and tri-alkyl amino borates, ammonium tetraphenyl borate and the like.

In the same reported aspect, it is added to the fact that the acidic route takes place in a container subjected to agitation and heating of the reagents inside the same, preferably a reactor with circulation for heating.

Further with regard to the reported aspect, the mixture of aluminum source, organic acid and boron source takes place in a reactor with circulation for heating.

In a second aspect, the support consists of aluminum source, organic acid and boron source, obtained according to the process described above.

With regard to the second inventive aspect, it is important to emphasize that the support described herein has a specific area of 80 to 250 $m^2/g$, preferably 100 to 230 $m^2/g$ and more preferably 150 to 200 $m^2/g$.

Further in this second aspect, the support composes the preparation of a hydrorefining catalyst (hydrotreating and hydrocracking).

Further in this second aspect, the hydrotreating catalysts include materials consisting of hydrogenating phases in oxidized form (at least one element of Group VIII (IUPAC) and/or Group VIB (IUPAC) and mixtures of both) supported on the support, object of the present invention, and this support can or cannot be associated with an inert matrix and/or with some acid-base activity (alumina, silica-alumina, zeolite, silica, titania, zirconia, magnesia, clay, hydrotalcite, among others) and/or with additives that promote acidic functions or of a specific nature, such as compounds based on boron and phosphorus. The catalyst shows activity in the sulfided form. Other possibilities for hydrotreating catalysts include the use of noble metals (Pt, Pd Rh, Ir, Ru, pure or multimetallic) as the hydrogenating phase. In this case, these are active in reduced form.

Further in this second aspect, for hydrocracking catalysts, materials consisting of a hydrogenating phase in the oxidized form (at least one element of Group VIII (IUPAC) and/or Group VIB (IUPAC) and mixtures of both) supported in the support, object of the present invention, which support can or cannot be associated with an inert matrix and/or with some acid activity (alumina, silica-alumina, zeolite, silica, titania, zirconia, among others) and/or with additives that promote acidic functions or of a specific nature, such as, for example, compounds based on boron and phosphorus. The catalysts are activated by sulfidation. Other possibilities for hydrocracking catalysts include the use of noble metals (Pt, Pd Rh, Ir, Ru, pure or multimetallic) as the hydrogenating phase. In this case, these are active in reduced form.

Further in this second aspect, the contents of the hydrogenating phases of the active hydrorefining catalysts in the sulfided form, expressed as the total charge of oxides and in relation to the total mass of the final catalyst, can be 0.5 to 10% by mass of constituent of the group VIII (pure or in mixtures with each other) and 5 to 30% of constituent of group VIB (pure or in mixtures with each other).

Further in this second aspect, the contents of the hydrogenating phases of the active hydrorefining catalysts in the reduced form, expressed as the total charge of noble metals and in relation to the total mass of the final catalyst, can be 0.1 to 20% by mass of metal noble (Pt, Pd, Rh, Ir, Ru) pure or in mixtures with each other.

The second aspect of this invention further comprises the fact that in the preparation of hydrorefining catalysts, the hydrogenating phase is introduced into the support, with or without pH adjustment.

With regard to the second aspect of the present invention, it is also noted that the support obtained through the method described in the present invention is used to improve the performance of boron and alumina-based catalysts, by preventing the leaching of boron.

In a third aspect of the present invention, it should be noted that the supported catalyst is obtained through the following steps:

(a) preparing a homogeneous aqueous solution containing one or more elements of group VIII, meeting the requirements for wet point impregnation of the support, object of the present invention, and making up a total charge on the final catalyst of 0.5 to 10% by mass (as oxides and in relation to the final mass of the catalyst) of constituent of group VIII (pure or in mixtures with each other);
(b) adding to the mixture from step (a) a quantity of phosphoric acid, not restricted to this specific source of phosphorus, sufficient for the final catalyst to present from 0.1 to 3.0% by mass of phosphorus;
(c) agitating the mixture obtained in step (b) until any form of foam disappears;
(d) adding one or more elements of group VIB, sufficient to make up a total charge on the final catalyst of 5 to 30% by mass (as oxides and in relation to the final mass of the catalyst) of constituent of group VIB (pure or in mixtures between the same);
(e) completing the volume sufficient for wet point impregnation of the support, object of the present invention, and heating this system to 80 to 100° C., preferably 80 to 95° C. and more preferably to 90 to 95° C.;
(f) agitating the system until solubilization is complete;
(g) cooling the system and impregnating at the wet point an amount of the support, object of the present invention, in order to meet the total charge of the elements of group VIII and VIB in the final catalyst.

In this third aspect of the invention, the supported catalyst is cooled and the pH is adjusted to 2.0 to 4.0, preferably 2.0 to 3.0 and more preferably 2.5 to 3.0, with the use of ammonium hydroxide.

Further in this third aspect, the solution must be added to the support with agitation, after which it is kept at rest for 1 hour, with occasional agitation.

It remains to describe that in this third inventive aspect, the precursor is dried at 80 to 120° C. for 1 to 2 hours and then calcined at 400 to 700° C. for 1 to 2 hours.

It still remains to describe that the support, object of the present invention, can be impregnated at the wet point with pure noble metals (sources of Pt, Pd, Rh, Ir and Ru) or in mixtures with each other.

EXAMPLES

Example 1

Preparation of the support for reference: The support was prepared by mixing a hydrated alumina with boric acid ($H_3BO_3$) in a mixer to form a slurry. Water can be evaporated or added to adjust the slurry for extrusion. After extrusion, the support was dried at 120° C. overnight and calcined at 700° C., obtaining a concentration of final $B_2O_3$ of 3.75% by mass. This support will be referred to hereinafter as SUPREF.

Example 2

Preparation of the support by acidic route, object of the present invention: In a reactor with circulation for heating, aluminum nitrate and acetic acid were mixed in a molar ratio of 1:1 (510 g and 80 mL, respectively) and 3.8 g of boric acid. Then, sufficient volume of deionized water was added to allow the reagents to mix. The mixture was heated at 30° C. for 5 to 10 minutes, under agitation, for total homogenization of the reagents. Then, the temperature was raised to 60° C. and kept for 1 hour. After this time, the temperature was raised to 80° C. and maintained in this condition for 1.5 hours. The pH of the mixture was measured with an interval of 30 minutes during the reaction, from the moment the temperature reached 60° C. Then, agitating and heating were turned off and the sample was left to cool overnight.

The material was dried at 120° C. for 4 hours and then the samples were calcined at a temperature of 700° C. for 3 h. This sample is hereinafter called SUP1.

Example 3

Catalyst preparation without pH adjustment: The support of example 2 was used to prepare the catalyst, hereinafter called CAT1. 6.0 g of nickel carbonate ($NiCO_3.2Ni(OH)2.4H_2O$) were added to 5 ml of agitating water, followed by the addition of 5.1 g of phosphoric acid, and agitating was maintained to minimize the release of foam.

After the foam release ceased, 18.4 g of molybdenum oxide ($MoO_3$) were added, the volume of the solution was completed to 20 ml and the system was heated to 95° C., maintaining the agitating and reflux of the system until complete solubilization.

Next, the solution was then cooled and 67 g of the support were impregnated. The solution was added to the support with agitating, after which it was kept at rest for 1 hour, with occasional agitation. The precursor was then dried at 120° C. for 1 hour and then calcined at 450° C. for 1 hour. The final contents in the catalyst are shown in Table 1 below.

TABLE 1

| Final contents in the CAT1 catalyst | |
|---|---|
| | Contents (% by mass) |
| NiO | 4.0 |
| $MoO_3$ | 20 |
| P % | 1.5 |

Example 4

Catalyst preparation with pH adjustment: The support of example 2 was used to prepare the catalyst, hereinafter called CAT2. 6.0 g of nickel carbonate ($NiCO_3·2Ni(OH)2.4H_2O$) were added to 5 ml of agitating water, then 5.1 g of phosphoric acid was slowly added while agitating to minimize foaming. In this case, we waited for the foam to disappear before adding 18.4 g of molybdenum oxide ($MoO_3$). Then, the volume of the solution was made up to 20 ml, the system was heated to 95° C. and the system was agitated and refluxed until complete solubilization. The solution was then cooled and the pH was measured, which should be adjusted to 2.5 using ammonium hydroxide. After that, 67 g of the support could be impregnated. The solution should be added to the support with agitation, after which it was kept at rest for 1 hour, with occasional agitation. The precursor was then dried at 120° C. for 1 hour and then calcined at 450° C. for 1 hour. Final contents in the catalyst are shown in Table 2 below.

TABLE 2

| Final contents in the CAT2 catalyst | |
|---|---|
| | Contents (% by mass) |
| NiO % m | 4.0 |
| $MoO_3$ % m | 20 |
| P % m | 1.5 |

Example 5

Commercial catalyst: Commercial catalyst for hydrotreating for the production of ultra-low sulfur diesel oil used as a reference hereinafter called CATREF1.

Example 6

Extraction with deionized water: About 2 g of the catalysts and supports to be evaluated were weighed with granulometry between 150 and 325 mesh. Each extraction was performed individually, and the samples were washed with water, using a Soxhelt, mounted according to ASTM D5369-93. When the temperature reached 100° C., the extraction was continued for a period of 2 hours. After extraction, the system was turned off and cooled. With the cold system, the catalysts and supports were dried in porcelain capsules at 120° C. for 18 hours. All supports and catalysts after the process were kept with the original name, but the term "-2h" was added to the end of the name to represent them after the extraction process with deionized water. So SUP1 is called SUP1-2h after leaching.

Example 7

Boron loss after leaching to the support: The results of SUPREF supports, reference support prepared as described in example 1 and SUP1 the support that is object of this patent prepared as described in example 2 are presented in Table 3. Both supports lose Boron under the conditions evaluated, but while the reference support suffers an approximate reduction of 77% by mass in the boron content of the original support after leaching, the support that is object of the patent suffers a reduction of only 51% by mass approximately. Almost 30% less Boron losses than the support prepared by the traditional method.

TABLE 3

Boron content results before and after extraction for the support prepared in the patent and for the reference support.

| Sample | B content (mg/kg) | Boron content (%) | $B_2O_3$ Content (%) |
|---|---|---|---|
| SUPREF | 9700 | 0.97 | 3.12 |
| SUPREF-2 h | 2200 | 0.22 | 0.71 |
| SUP1 | 7700 | 0.77 | 2.48 |
| SUP1-2 h | 3800 | 0.38 | 1.22 |

Example 8

The specific area is essential for the hydrorefining process. The SUPREF support has an area of 195 m²/g and the SUP1 of 187 m²/g, showing that the proposed preparation method has the advantage of fixing the boron, without prejudice to the loss of specific area.

Example 9

Boron loss after leaching for the catalysts: For the reference catalyst CATREF1 and the catalysts prepared from the support hat is object of this patent (CAT1 and CAT2) the same leaching procedure described in example 6 was used. Boron loss for the prepared catalysts and the reference catalyst are shown in Table 4, expressed as initial and final $B_2O_3$ mass calculated relative to the support.

Table 4 presents the results of $B_2O_3$ content before and after extraction for the catalysts prepared in the present invention and for the commercial reference catalyst. The mass loss of $B_2O_3$ from the commercial catalyst in the evaluation condition is approximately 71%, while the catalysts prepared without and with pH adjustment have an approximate loss of 18 and 21%, respectively. In this way, it is demonstrated that the method of preparation of the support fixes the boron in the same, and additionally the step of preparation of the catalyst still contributes to the reduction of the losses of boron in the support and consequently in the final catalyst. The pH effect of the final catalyst preparation for boron fixation is not significant, so the adjustment can or cannot be used as a step in the catalyst preparation.

TABLE 4

Comparison between the results of $B_2O_3$ content before and after extraction

| Sample | CATREF1 | CATREF1-2 h | CAT1 | CAT1-2 h | CAT2 | CAT2-2 h |
|---|---|---|---|---|---|---|
| Mass of $B_2O_3$ (g) | 1.90 | 0.55 | 1.35 | 1.11 | 1.64 | 1.29 |
| Loss of mass (%) | | 71 | | 18 | | 21 |

Thus, the present invention proposes a method of preserving the activity of hydrorefining catalysts over the campaign time, maintaining the productivity of the units over the operating time, which reduces the operating cost by the intensive use of the activity and catalyst stability.

This invention has the potential for application of these catalysts in industrial units for hydrotreating naphtha (gasoline), kerosene, diesel, paraffins, lubricants, catalytic reform pretreatment, solvent hydrogenation, delayed coking naphtha hydrogenation, pre-treatment of charges from catalytic cracking units (FCC), pre-treatment and hydrocracking of industrial hydrocracking units for diesel, hydrotreatment of residues in general, etc.

Therefore, the addition of boron and its maintenance in the catalyst allows the operation of hydrorefining units in high performance throughout its campaign, contributing to increase the refining margins and contributing as a technological solution to the equation of the production of S10 diesel oil and aviation kerosene in a scenario of increased S10 diesel oil share.

Such hydrorefining catalysts with acidic cracking activity allow the processing of heavier charges (temperature reduction of 95% vol. vaporized in distillation ASTM D-86), minimizing the production losses arising from 100% market service S10 diesel. More active catalysts can also be used for opportunities of export grade diesel oil production (EN-590) in existing high severity units.

The invention claimed is:

1. A method of obtaining a support for hydrorefining catalysts, characterized in that it comprises the following steps:
   (a) mixing an aluminum source, an organic acid, and a boron source;
   (b) adding deionized water to allow the aluminum source, an organic acid, and a boron source to mix and produce a mixture;
   (c) heating the mixture obtained in step (b) between 25° C. and 60° C.;
   (d) homogenizing the mixture, under agitation;
   (e) heating the mixture obtained in step (d) to 60° C. to 80° C. and maintaining for 1 to 4 hours;
   (f) raising a temperature of the mixture obtained in step (e) to 80° C. to 120° C. and maintaining for 1 to 3 hours;
   (g) turning off agitation and heating, allowing the mixture to cool to room temperature;
   (h) drying the mixture obtained in step (g) at 80° C. to 120° C. for up to 8 hours; and
   (i) calcining the mixture obtained in step (f) at 500° C. to 800° C. for up to 6 hours.

2. The method according to claim 1, further comprising measuring a pH of the mixture once the mixture reaches a temperature of 60° C. and with an interval of 30 minutes thereafter.

3. The method according to claim 1, wherein the mixture of the aluminum source with the organic acid is carried out in an X/Y molar proportion, where X is the aluminum source and Y the organic acid, wherein the molar ratio can vary from 10/1 to 1/10.

4. The method according to claim 1, characterized in that the boron source is added so that a boron content, expressed as an oxide ($B_2O_3$) and based on a total support mass, is from 0.1 to 10% by mass of the final support.

5. The method according to claim 1, wherein the aluminum source(s) is/are pure(s) or mixture(s) with each other, and comprises aluminum-based compounds.

6. The method according to claim 1, wherein the organic acid(s) is/are pure or mixture(s) with each other, which comprises carboxylic acids containing 1 to 6 carbon atoms.

7. The method according to claim 1, wherein the source(s) of boron is/are pure(s) or mixture(s) with each other, and comprise boron-based compounds, meta-boric acid ($HBO_2$), ortho-boric acid ($H_3BO_3$), ammonium borate tetrahydrate [$(NH_4)2B_4O_7·H_2O$], sodium tetra borate, ammonium borate, ammonium tetra borate, boron oxide ($B_2O_3$), various mono, di and tri-alkyl amino borates, or ammonium tetraphenyl borate.

8. The method according to claim 1, wherein mixing with the organic acid takes place in a container subjected to agitation and heating of the reagents inside the same.

9. The method according to claim 1, wherein mixing aluminum source(s), organic acid and boron source(s) takes place in a reactor with circulation for heating.

10. A process of obtaining a hydrorefining catalyst, the method comprising:
   (a) preparing a homogeneous aqueous solution containing one or more elements of group VIII, meeting requirements for wet point impregnation of the support and making up a total charge on a final catalyst of 0.5 to 10% mass (as oxides and in relation to a final mass of the catalyst) of constituent of group VIII (pure or in mixtures with each other);
   (b) adding to the mixture from step (a) a quantity of phosphoric acid sufficient for the final catalyst to present from 0.1 to 3.0% by mass of phosphorus;
   (c) agitating the mixture obtained in step (b) until any form of foam disappears;
   (d) adding one or more elements of group VIB, sufficient to make up a total charge on the final catalyst of 5 to 30% mass (as oxides and in relation to the final mass of the catalyst) of constituent of group VIB (pure or in mixtures between the same)
   (e) completing a volume sufficient for wet point impregnation of the support and heating this system to 80° C. to 100° C.;
   (f) agitating the system until solubilization is complete; and
   (g) cooling the system and impregnating at the wet point an amount of the support, obtained according to the method described in claim 1, in order to meet the total charge of the elements of group VIII and VIB in the final catalyst.

11. The process according to claim 10, wherein the supported catalyst is cooled and the pH is adjusted to 2.0 to 4.0 with the use of ammonium hydroxide.

12. The process according to claim 10, wherein the solution must be added to the support with agitation, after which it is kept at rest for 1 to 4 hours.

13. The process according to claim 10, further comprising drying a precursor at 80° C. to 120° C. for 1 to 2 hours and then calcined at 400° C. to 700° C. for 1 to 2 hours, wherein further the support can be impregnated at the wet point with pure noble metals or in mixtures with each other.

14. The method according to claim 5, wherein the aluminum-based compounds comprise aluminum chloride, aluminum sulfate, aluminum isopropoxide, aluminum nitrate, or any combination thereof.

* * * * *